(12) United States Patent
Kröger

(10) Patent No.: US 9,964,335 B2
(45) Date of Patent: May 8, 2018

(54) CONCENTRATING CENTRAL SOLAR RECEIVER

(71) Applicants: Stellenbosch University, Stellenbosch, Western Cape Province (ZA); Klaus von Pressentin

(72) Inventor: Detlev Gustav Kröger, Stellenbosch (ZA)

(73) Assignee: STELLENBOSCH UNIVERSITY, Stellenbosch, Western Cape Province (ZA)

( * ) Notice: Subject to any disclaimer, the term of this patent is extended or adjusted under 35 U.S.C. 154(b) by 228 days.

(21) Appl. No.: 14/782,077

(22) PCT Filed: Apr. 2, 2014

(86) PCT No.: PCT/IB2014/060380
§ 371 (c)(1),
(2) Date: Oct. 2, 2015

(87) PCT Pub. No.: WO2014/162277
PCT Pub. Date: Oct. 9, 2014

(65) Prior Publication Data
US 2016/0047574 A1     Feb. 18, 2016

(30) Foreign Application Priority Data
Apr. 3, 2013    (ZA) ................................ 2013/02381

(51) Int. Cl.
*F24J 2/24*       (2006.01)
*F24J 2/07*       (2006.01)

(52) U.S. Cl.
CPC . *F24J 2/07* (2013.01); *F24J 2/24* (2013.01); *Y02E 10/41* (2013.01)

(58) Field of Classification Search
CPC .................. F24J 2/07; F24J 2/24; Y02E 10/41
(Continued)

(56) References Cited

U.S. PATENT DOCUMENTS 4,136,674 A    1/1979   Korr
4,236,383 A    12/1980   Frosch
(Continued)

FOREIGN PATENT DOCUMENTS

DE       4433203 A1    3/1996
EP       2520872 A1    11/2012
(Continued)

OTHER PUBLICATIONS

European International Search Report and Written Opinion related to International Patent Application No. PCT/IB2014/060380 dated Jun. 27, 2014.

*Primary Examiner* — Vivek Shirsat
(74) *Attorney, Agent, or Firm* — Lathrop Gage LLP; Brian C. Trinque; Gordon Moriarty

(57) ABSTRACT

A central solar receiver (1) is provided having a heat exchanger assembly with walls that form an inlet chamber (2) and a generally juxtaposed outlet chamber (3) connected to each other by way of a multitude of tube assemblies (4). Each tube assembly (4) has an inner tube (6) and an outer tube (7) with the tube assemblies (4) extending away from the inlet and outlet chambers (2, 3). A remote end (8) of the outer tube (7) is closed and the inner tube (6) terminates short of that closed end (8). The interior of each inner tube (6) communicates with one of the inlet and outlet chambers (2, 3) and a space between each of the inner and outer tubes (6, 7) communicates with the other of the inlet and outlet chambers (2, 3) to form a passageway connecting the inlet and outlet chambers (2, 3) by way of the inner tube (6) and the space between the inner and outer tubes (6, 7) with a change in direction of flow of about 180°.

11 Claims, 4 Drawing Sheets

(58) Field of Classification Search
USPC ........ 126/663, 655, 651, 652, 635; 60/641.1
See application file for complete search history.

(56) References Cited

U.S. PATENT DOCUMENTS

| | | |
|---|---|---|
| 4,282,857 A | 8/1981 | Pei |
| 4,452,233 A * | 6/1984 | Goodman, Jr. .......... F24J 2/055 126/653 |
| 6,817,357 B2 * | 11/2004 | Brunotte .................. F24J 2/055 126/651 |

FOREIGN PATENT DOCUMENTS

| | | |
|---|---|---|
| FR | 2432147 A1 | 2/1980 |
| WO | 2011084902 A2 | 7/2011 |

* cited by examiner

CONCENTRATING CENTRAL SOLAR RECEIVER

RELATED APPLICATIONS

This application is a 35 U.S.C. § 371 filing of International Application No. PCT/IB2014/060380, filed Apr. 2, 2014, which claims priority to South African Patent Application No. 2013/02381, filed Apr. 3, 2013, each of which are incorporated herein by reference in their entireties.

FIELD OF THE INVENTION

This invention relates to a concentrating central solar receiver for use in a concentrating solar power plant for receiving reflected solar radiation from a heliostat field of solar radiation reflectors that are focused onto the central solar receiver.

More particularly, the invention relates to a central solar receiver in which a working gas, that may be air but is not necessarily so, is heated preparatory to it being fed to a gas turbine optionally via a combustion chamber.

BACKGROUND TO THE INVENTION

Concentrating solar power receivers have been made in a number of different configurations. Pressurized air (high pressure) and open air (low pressure) solar power receivers have both been tested successfully in research facilities and pre-commercial demonstration plants have been built. Prior receivers that can generate hot pressurized air include tubular receivers and closed volumetric receivers.

Tubular receivers are termed indirectly-irradiated receivers and generally consist of multiple high temperature resistant metal alloy boiler tubes through which is passed a pressurized working fluid such as compressed air, water/steam, carbon dioxide or any other suitable working fluid.

On the other hand, open and closed volumetric receivers are regarded as directly-irradiated receivers. Closed volumetric receivers typically make use of a pressurized quartz window through which solar irradiation passes and strikes a porous absorber medium inside a pressurized chamber. Pressurized gas moves through the absorber medium and thus gains thermal energy while cooling down the absorber medium.

The heated pressurized gas, typically air, may be used for a variety of different purposes and one that is of particular interest to the applicant is to energize a gas turbine that is used to drive a suitable machine such as an electrical generator.

A number of other heat collection arrangements have been proposed and the present invention presents an alternative that it is envisaged may have particularly effective results.

One of these is disclosed in European patent application publication number EP2520872. In the arrangement described multiple pyramidal elements are carried by a common chamber wall and heat transfer fluid to be heated is introduced to the apex of each of the pyramidal elements and become heated as it flows between the outer wall of the pyramidal element that become heated by solar energy and an inner pyramid wall spaced inwardly of the outer wall. The concept is to attempt to trap solar energy between the converging outer walls of adjacent pyramids.

It is to be noted that for the purposes of this specification the term "tube" is intended to mean an elongate hollow cylinder of generally constant cross-sectional shape along its length. Typically, the length of the tube will be at least twice and generally at least five times the cross-sectional size, and most commonly from 5 to 20 times the cross-sectional size, or more.

SUMMARY OF THE INVENTION

In accordance with this invention there is provided a central solar receiver having a heat exchanger assembly with walls that form an inlet chamber and a generally juxtaposed outlet chamber connected to each other by way of a multitude of tube assemblies each of which has an inner tube and an outer tube with the tube assemblies extending away from the inlet and outlet chambers, wherein a remote end of the outer tube is closed and the inner tube terminates short of that closed end, wherein the interior of each inner tube communicates with one of the inlet and outlet chambers and a space between each of the inner and outer tubes communicates with the other of the inlet and outlet chambers so that a passageway is formed to connect the inlet and outlet chambers by way of the interior of the inner tube and a space between the inner and outer tubes with a change in direction of flow of about 180° at or towards the closed end of the outer tube of each tube assembly.

Further features of the invention provide for one of the inlet and outlet chambers to be located within the other so that one becomes an inner chamber and the other becomes an outer chamber with the inner tubes of each tube assembly passing from the inner chamber through the outer chamber and into the outer tube of each assembly with the result that the inner tube connects with the inner chamber and the outer tube connects with the outer chamber; for the closed end of each tube assembly to be of domed shape, typically hemispherical; and for the walls of the inlet and outlet chambers to be of generally concentric part spherical shape or, alternatively, concentric cylindrical or part cylindrical shape in either of which instances the tube assemblies extend generally radially relative to the concentric walls.

Still further features of the invention provide for the tube assemblies to have one of a plurality of different lengths being at least two different lengths and possibly three or four, that extend in a generally radial direction away from the chambers so that the closed ends of the outer tubes of the tube assemblies are at different distances from the inlet and outlet chambers; for the inside tubes to be free to move at least axially within the outer tubes, thereby minimizing thermal stresses; and for an arrangement of fins that may be straight or follow a helical path to be provided between the inner and outer tubes of each tube assembly in order to enhance heat transfer to gas flowing within the passage and to confine the inner tube to approximately coaxial movement relative to the outer tube should differential expansion and contraction occur in different parts of the heat exchanger assembly.

In order that the above and other features of the invention may be more fully understood different embodiments of the invention will now be described with reference to the accompanying drawings.

DETAILED DESCRIPTION WITH REFERENCE TO THE DRAWINGS

In the embodiment of the invention illustrated schematically in the accompanying drawings, a central solar receiver, indicated generally by numeral (1), has a heat exchanger assembly with walls that form an inner inlet chamber (2) and a generally concentric juxtaposed outer outlet chamber (3) wherein the two chambers are connected to each other by way of a multitude of tube assemblies (4). The two chambers are of generally concentric part spherical shape in this embodiment of the invention so that reflected solar irradiation of a heliostat field can be suitably received and the tube assemblies extend with their axes generally radial relative to the concentric walls of the two chambers, that is, in the general direction from which irradiation will be received, in use.

Figure 1:
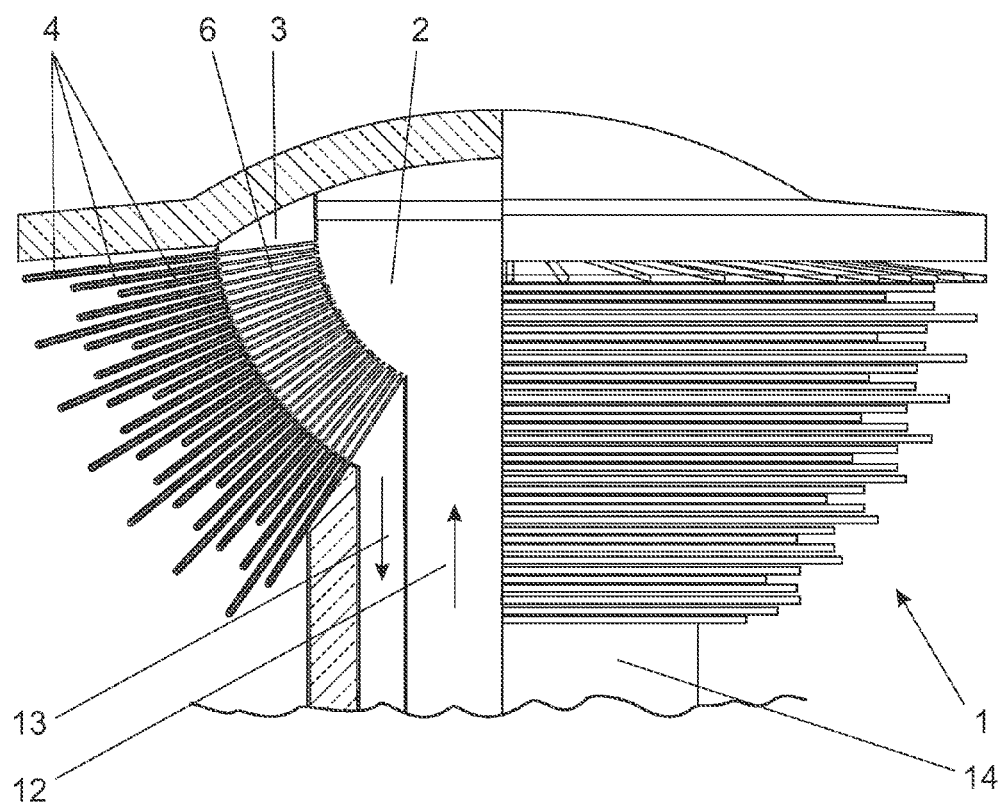
FIG. 1 is a partly sectioned schematic elevation of one embodiment of a central solar receiver according to the invention.

The tube assemblies therefore extend in a generally downwardly inclined direction, as shown most clearly on the left-hand side of FIG. 1, and their outer ends terminate in one of a series of generally squat cylindrical envelopes that are shown as elongate horizontal rectangles on the right-hand side of FIG. 1.

Each of the tube assemblies has, as shown most clearly in FIGS. 3 to 6, an inner tube (6) and an outer tube (7) with the tube assemblies extending away from the inlet and outlet chambers. A remote closed end (8) of the outer tube is at an outermost position relative to the inlet and outlet chambers. The closed end of each outer tube of each tube assembly is of domed shape, typically hemi-spherical, in order to facilitate the change of direction of gases impinging on the closed end by changing their direction of flow through 180°.

The inner tube (6) terminates short of the closed end (8) of the outer tube. Towards its other end the inner tube extends through the outer outlet chamber (3) so that its innermost end (9) communicates with the inner inlet chamber (2).

The outer tube (7) of each tube assembly communicates between the closed end thereof and the outlet chamber (3) such that a space (11) between each of the inner and outer tubes is available for the flow of gas from the closed end of the outer tube to the outlet chamber.

In this way a passageway is formed that connects the inlet and outlet chambers by way of the interior of the inner tube and the space between the inner and outer tubes with a change in direction of flow of 180° at or towards the closed end of the outer tube of the tube assembly. The inner tube thus connects with the inner chamber and the outer tube connects with the outer chamber.

In order for the tube assemblies to absorb a satisfactory amount of solar energy impinging on the central solar receiver, the tube assemblies have one of a plurality of different lengths, in the present instance three different lengths, that extend in a generally radial direction away from the chambers. This being so, the closed ends of the outer tubes of the tube assemblies are at different distances from the inlet and outlet chambers.

Figure 2:
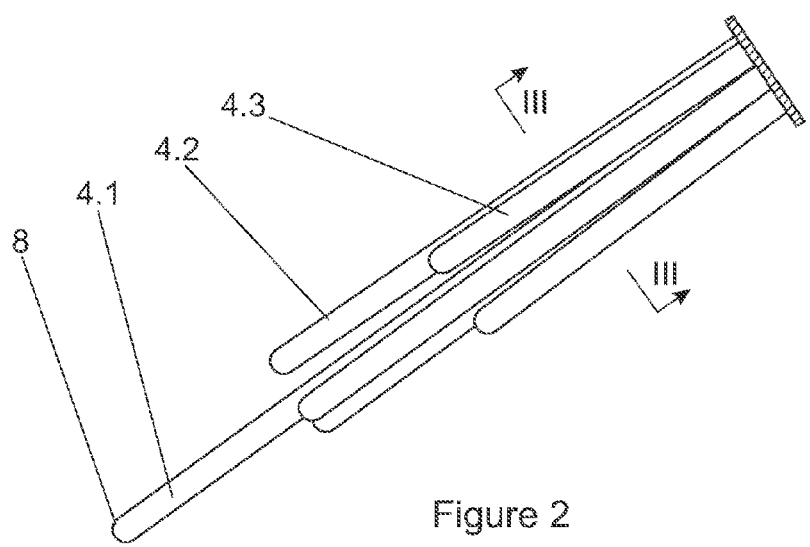
FIG. 2 is a detailed schematic side elevation of one cluster of tube assemblies forming part of the embodiment of the invention illustrated in FIG. 1.
Figure 3:
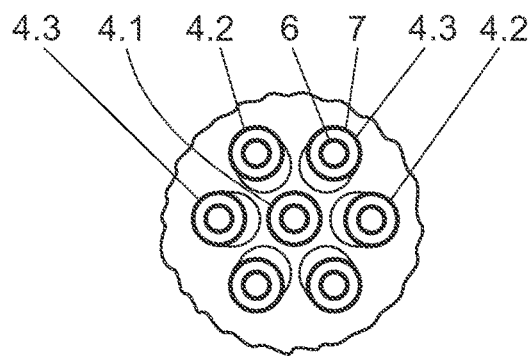
FIG. 3 is a schematic section taken a long line III-III in FIG. 2.
Figure 4:
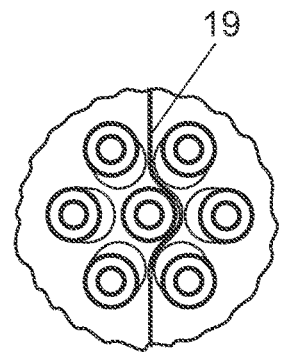
FIG. 4 is the same as FIG. 3 but showing an additional wind shield installed between the tube assemblies of a cluster thereof.
Figure 5:
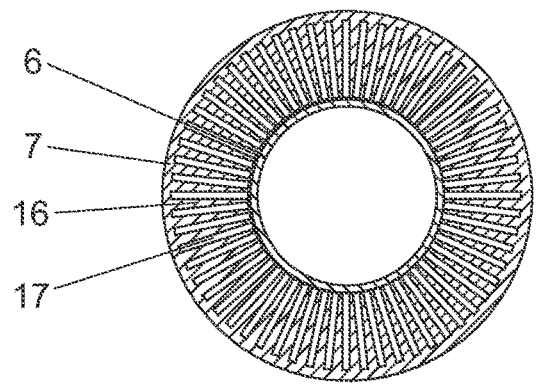
FIG. 5 is a schematic cross-section taken through one tube assembly and showing more clearly the construction thereof.
Figure 6:
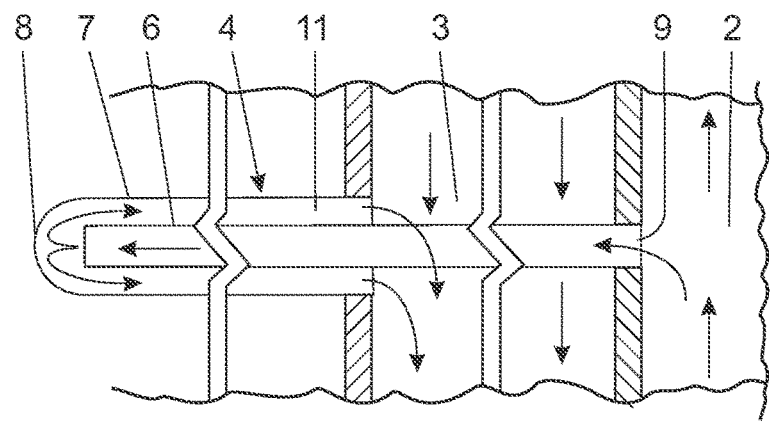
FIG. 6 is a schematic longitudinal section through a tube assembly showing only parts thereof with longitudinal sections broken out and illustrating the flow of air therein.

The tubes of different lengths may be arranged in clusters thereof with a central longest tube assembly (4.1) surrounded by six equally angularly spaced intermediate length tube assemblies (4.2) and shortest length tube assemblies (4.3) surrounding the central longest one with the intermediate length tubes and shortest length tubes being alternated in the circumferential direction. This arrangement is shown in FIGS. 2 to 4.

Also, it will be understood that the tubes are designed for absorption of solar radiation in the usual way and the exact nature of the heat absorbing surfaces thereof is not of any consequence to the present invention, although it has an effect on the efficiency of the central solar receiver.

The arrangement gives rise to a truncated generally hemispherical downwardly directed assembly, as shown clearly FIG. 1 with a central air inlet (12) communicating with the inlet chamber and a central air outlet (13) communicating with the outlet chamber by way of an upright support (14) for the central solar receiver.

In order to accommodate differential expansion and contraction, the inside tubes are free to move longitudinally within the outer tubes, thereby minimising thermal stresses. In order to achieve this and enhance heat transfer an arrangement of fin formations (16) is provided on the inside of the outer tube between the inner and outer tubes of each tube assembly. Conveniently the fins are formed between the walls of generally rectangular longitudinally extending passages (17). The fins may extend straight along the length of the tubes or, alternatively, they may follow a generally helical path.

It is envisaged that there may be a negative effect of wind impinging on a central receiver as described above and it is envisaged that various measures may be taken to counteract these negative effects. FIG. 4 illustrates one proposal in which a windshield (19) is interposed between various tube assemblies of a cluster thereof. Many other measures may be taken.

The tubes may have diameters from 10 to 100 mm and fin heights generally within the range of 5 mm to 20 mm. Flow passage dimensions and therefore internal diameters of the tubes are selected for different tube lengths in order to target an optimum air flow rate through individual tubes, resulting in a heat exchanger assembly that has a satisfactory effectiveness. The lengths of the tubes may, for example, be from about 5 to 20 tube diameters for the shortest tubes, for example from about 12 to 14 diameters; from 15 to 35 diameters for medium length tubes, for example about 30; and from 20 diameters upwards for the longest tubes, for example about 40. Tube materials should be strong enough to withstand the high pressures and temperatures and should have a suitably high thermal conductivity.

Figure 8:
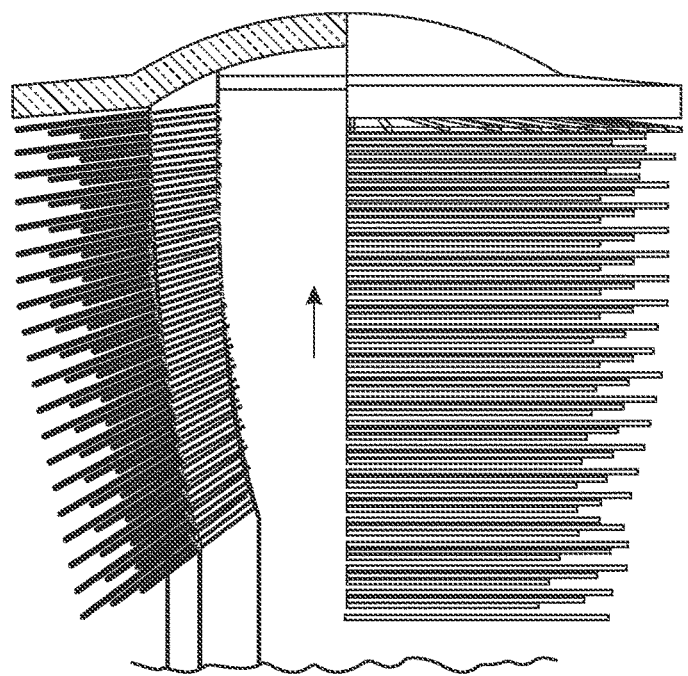
FIG. 8 is a partly sectioned schematic elevation of a third embodiment of central solar receiver according to the invention.
Figure 9:
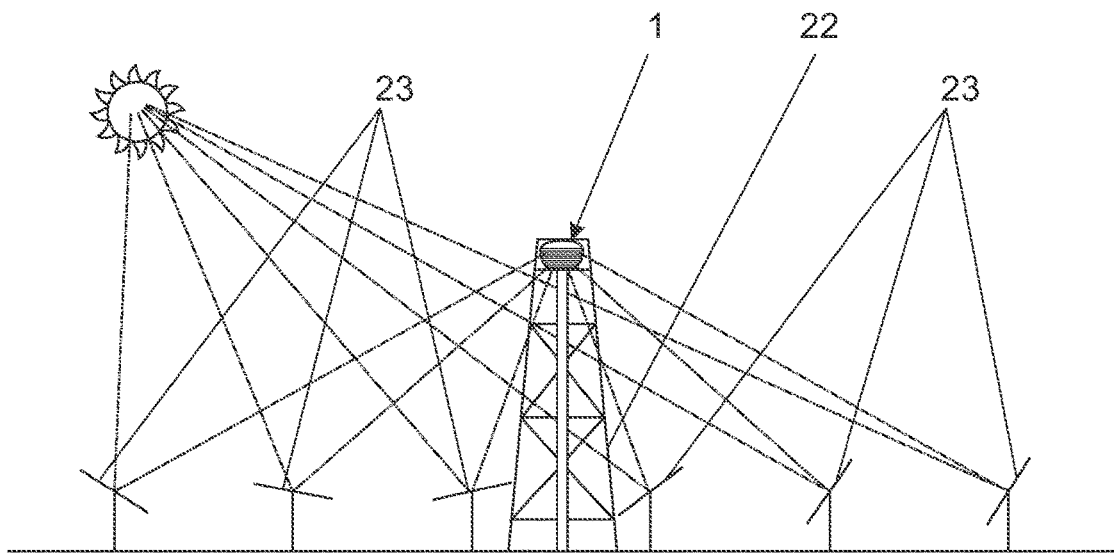
FIG. 9 is a schematic illustration of an arrangement of a heliostat field and a central tower supporting a central solar receiver; and, FIG. 10 is a schematic circuit diagram of a basic concentrating solar power collector plant that may employ a central solar receiver according to the invention.
Figure 10:
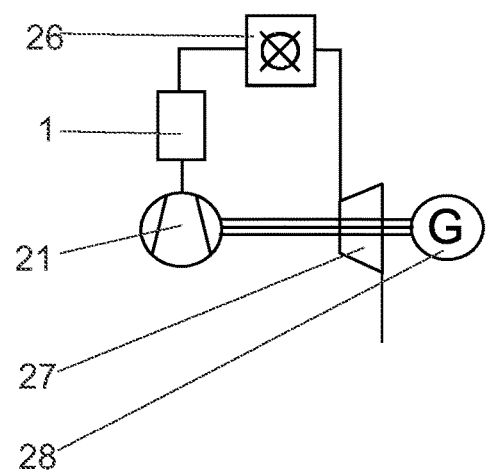

For use, and with reference to FIGS. 8 and 9, the inlet is connected to the outlet from a suitable compressor (21) in known manner so that air under pressure is supplied to the inlet chamber. The air under pressure flows from the inlet chamber along the multiple inner tubes of the multiple tube assemblies and reverses direction at the closed ends of the outer tubes to pass through the space between the inner tube and the outer tube and thereafter enter the outlet chamber and pass through an outlet. The central receiver arrangement (1) for a solar power facility is mounted on the upper end of a tower (22) in a field of heliostats (23).

It should be noted that whilst air is used as the working fluid in the embodiment of the invention described above, any other suitable working fluid may be used as will be quite apparent to those of ordinary skill in the art.

The central receiver arrangement comprises the pressurized air solar power receiver (1) according to the invention which is located downstream of the compressor (21) and upstream of an optional combustion chamber (26) for fuel to increase the gas temperature as may be required and the expansion unit of a gas turbine (27). The gas turbine may be arranged to drive both the compressor and an electrical generator (28). The arrangement would generally operate on a Brayton cycle.

The heat exchanger concept described above is one in which heat from concentrated solar radiation may be effectively transferred to a pressurized air stream at a high temperature.

Figure 7:
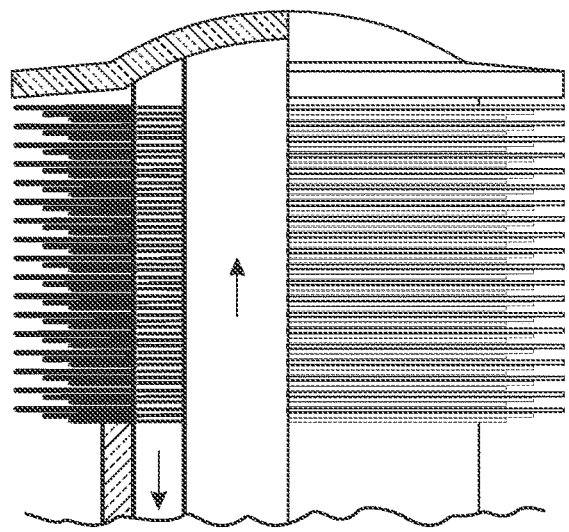
FIG. 7 is a partly sectioned schematic elevation of a second embodiment of central solar receiver according to the invention.

For larger central receiver power plants, the general outer shape of the receiver may be a generally circular cylindrical shape as shown in FIG. 7.

Of course any other shape may be employed such as a generally cylindrical shape that has a lower convex portion as shown in FIG. 8. It is to be noted that in this instance the tube assemblies extend in a generally downwardly inclined direction, as shown most clearly on the left-hand side of FIG. 8, and their outer ends terminate in generally squat cylindrical envelopes that are shown as elongate horizontal rectangles on the right-hand side of FIG. 8.

In all instances the angle at which the tube assemblies extend is in the same general direction as that from which reflected solar radiation is received, although it may not be exactly so, depending on requirements and design factors.

In certain applications the flow direction of working fluid in the tubes may be reversed and the internal tubes may be finned. As an alternative to fins, twisted tape inserts may be employed to enhance heat transfer. Heat transfer fluids other than air may be employed, as may be appropriate.

It is to be noted that this central receiver arrangement can absorb radiation from a 360° heliostat field if required.

The invention claimed is:

1. A central solar receiver having a heat exchanger assembly with walls that form an inlet chamber and a juxtaposed outlet chamber connected to each other by way of a multitude of tube assemblies each of which has an inner tube and an outer tube with the tube assemblies extending away from the inlet and outlet chambers, wherein a remote end of the outer tube is closed and the inner tube terminates short of that closed end, wherein the interior of each inner tube communicates with one of the inlet and outlet chambers and a space between each of the inner and outer tubes communicates with the other of the inlet and outlet chambers so that a passageway is formed to connect the inlet and outlet chambers by way of the interior of the inner tube and a space between the inner and outer tubes with a change in direction of flow of about 180° at or towards the closed end of the outer tube of each tube assembly wherein the solar receiver is characterized in that the tube assemblies are arranged in a plurality of clusters, wherein each cluster has a plurality of tube assemblies with at least one tube assembly in each cluster having a different length selected from three or more different lengths that extend in a radial direction away from the chambers so that the closed ends of the outer tubes of the tube assemblies in a cluster are at at least three different distances from the inlet and outlet chambers.

2. A central solar receiver as claimed in claim 1 in which one of the inlet and outlet chambers is located within the other so that one becomes an inner chamber and the other becomes an outer chamber with the inner tubes of each tube assembly passing from the inner chamber through the outer chamber and into the outer tube of each assembly with the result that the inner tube connects with the inner chamber and the outer tube connects with the outer chamber.

3. A central solar receiver as claimed in claim 1 in which the closed end of each tube assembly is of a domed shape.

4. A central solar receiver as claimed in claim 1 in which the walls of the inlet and outlet chambers are of a concentric part spherical shape.

5. A central solar receiver as claimed in claim 1 in which the walls of the inlet and outlet chambers are of a concentric cylindrical or part cylindrical shape.

6. A central solar receiver as claimed in claim 1 in which the walls of the inlet and outlet chambers are of a cylindrical shape that has a lower convex portion.

7. A central solar receiver as claimed in claim 1 in which the inner tubes are free to move axially within the outer tubes to thereby minimize thermal stresses.

8. A central solar receiver as claimed in claim 1 in which an arrangement of fins that may be straight or follow a helical path is provided between the inner and outer tubes of each tube assembly.

9. A central solar receiver as claimed in claim 1 in which a length of each tube is at least twice the tube diameter.

10. A central solar receiver as claimed in claim 9 in which the lengths of the tubes are at least 5 times the tube diameter.

11. A central solar receiver as claimed in claim 1 in which the lengths of the tubes are from 5 to 40 tube diameters.

* * * * *